US010583826B2

(12) United States Patent
Books et al.

(10) Patent No.: US 10,583,826 B2
(45) Date of Patent: Mar. 10, 2020

(54) HYBRID VEHICLE DRIVE CYCLE OPTIMIZATION BASED ON ROUTE IDENTIFICATION (71) Applicant: Cummins Inc., Columbus, IN (US)

(72) Inventors: Martin T. Books, Columbus, IN (US); Gary L. Parker, Columbus, IN (US); Arun Prakash Thunga Gopal, Columbus, IN (US); Jennifer Kay Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 13 days.

(21) Appl. No.: 15/813,408

(22) Filed: Nov. 15, 2017

(65) Prior Publication Data
US 2018/0134275 A1 May 17, 2018

Related U.S. Application Data (60) Provisional application No. 62/423,331, filed on Nov. 17, 2016.

(51) Int. Cl.
B60W 20/12 (2016.01)
B60W 10/06 (2006.01)
B60W 10/08 (2006.01)
B60W 10/26 (2006.01)

(52) U.S. Cl.
CPC .......... B60W 20/12 (2016.01); B60W 10/06 (2013.01); B60W 10/08 (2013.01); B60W 10/26 (2013.01); B60W 2510/244 (2013.01); B60W 2550/22 (2013.01); B60W 2550/402 (2013.01); Y02T 10/6286 (2013.01); Y10S 903/93 (2013.01)

(58) Field of Classification Search
CPC ...... B60W 20/12; B60W 10/26; B60W 10/08; B60W 10/06; B60W 2510/244; B60W 2550/22; B60W 2550/402; Y02T 10/6286; Y10S 903/93
See application file for complete search history.

(56) References Cited

U.S. PATENT DOCUMENTS

| 7,715,958 | B2 | 5/2010 | Kumar | |
| 9,087,445 | B2 | 7/2015 | Uno | |
| 2013/0324357 | A1* | 12/2013 | Stenson | B60W 20/10 477/3 |
| 2014/0244103 | A1 | 8/2014 | Uno | |
| 2016/0167542 | A1 | 6/2016 | Kim | |
| 2018/0045525 | A1* | 2/2018 | Ara jo | G01C 21/3469 |

FOREIGN PATENT DOCUMENTS

| CN | 104648379 | 5/2015 |
| CN | 105151040 | 12/2015 |
| DE | 19831487 | 6/2000 |
| EP | 2857271 | 4/2015 |
| WO | 2013055830 | 4/2013 |
| WO | 2015106772 | 7/2015 |
| WO | 2015197094 | 12/2015 |

* cited by examiner

Primary Examiner — Yuen Wong
(74) Attorney, Agent, or Firm — Taft Stettinius & Hollister LLP (57) ABSTRACT Systems and methods are disclosed for controlling vehicle operations in response to a route identification reference for a vehicle based on route characteristics associated with the route identified by the route identification reference.

18 Claims, 4 Drawing Sheets

HYBRID VEHICLE DRIVE CYCLE OPTIMIZATION BASED ON ROUTE IDENTIFICATION

CROSS REFERENCE TO RELATED APPLICATION

The present application claims the benefit of U.S. Provisional Application Ser. No. 62/423,331 filed on Nov. 17, 2016, which is incorporated herein by reference.

BACKGROUND

The present application generally relates to hybrid drive cycle optimization, and in particular relates to drive cycle optimization based on a route identification for the hybrid vehicle.

Some hybrid vehicle applications involve the programming into the control system some indication of the driving route to be followed by the vehicle so energy usage decisions can be made more optimal. Examples include programming a destination and possibly a driving route and mating this system with a global positioning system (GPS) for trip planning, or maybe even planning stops for battery recharging. Other examples simply have the operator enter a total trip distance to be travelled so that battery usage can be planned. However, this often requires a considerable amount of data and/or external devices in order to gather and evaluate the route data and determine one or more system control outputs to be made in response to the route condition. Or, it may require the operator to gather and input data that may not be readily available (such as destination or travel distance) in order to achieve the claimed optimization. Therefore, a need remains for further improvements in systems and methods in this area.

SUMMARY

One embodiment is a unique system, apparatus and method for optimizing a vehicle drive cycle in response to entry of a route identification reference associated with a route so the drive cycle is controlled based on one or more route characteristics along the route. Other embodiments include apparatuses, systems, devices, hardware, methods, and combinations thereof for controlling operation of a hybrid vehicle in response to a route identification reference This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Many commercial vehicles drive cycles that often repeat due to traversing the same route or loop, sometimes several times a day. Examples of such vehicles include transit busses and delivery vehicles. For example, a transit bus can have a fixed drive cycle that includes the exact route, or exact loop that is repeated to form a route, and stop times set by a timetable published by a responsible transit authority. It is possible to define a myriad of route characteristics or statistics of a drive cycle by associating these route characteristics with a known route identification reference, such as a particular route number. The route identification reference can be used to reference information such as distance for a single loop of the route, number of loops of the route per day or other unit of time, a number of opportunities for battery boost charging per loop, a number of scheduled stops per loop, a distance to and between stops, a nominal total energy a vehicle may require to complete a single loop, elevation range, route surface grade, a route surface type, a maximum speed limit, a minimum speed limit, a maximum route trip time, a traffic condition, and certainly numerous other statistics.

For a hybrid vehicle system, many of these route characteristics can be provided to and stored in a hybrid controller with ample information to allow increased optimization of the drive cycle by controlling, for example, battery usage, plug-in energy depletion strategy, recharge planning, and engine On/Off decisions, based solely on the input of the route identification reference. With relatively minimal computer memory burden, route characteristics statistics such as these can be preprogrammed into the hybrid controller such that all that is needed to adjust optimization decisions is the entry of the current route identification reference, either through an operator interface or via a controller that displays the bus route number such as at a bus stop.

Such an arrangement could also be enhanced by allowing the vehicle to tally its own statistics, reproducing those provided for the particular route. Real-time tallying of duplicate statistics could be helpful to refine the baseline statistical or route characteristic data for an associated route identification reference. It could also be helpful to recognize off-nominal conditions which could produce other changes in behavior of the vehicle along the route. Lastly, these tallied statistics could be used for diagnostic purposes of the vehicle.

Figure 1:
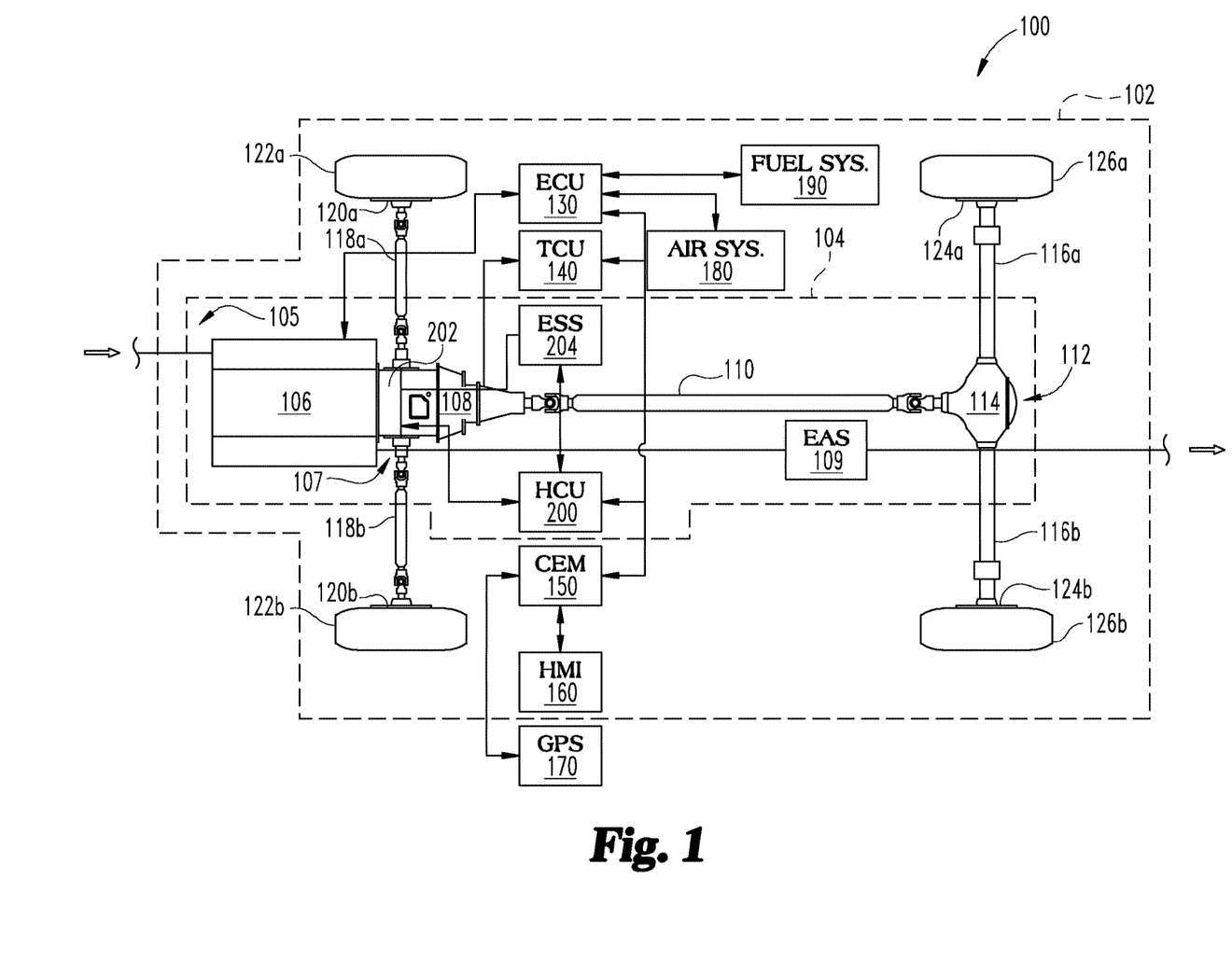
FIG. 1 is a block diagram of an example hybrid vehicle system.

With reference to FIG. 1, there is illustrated an example vehicle system 100 that includes a vehicle 102 with a hybrid powertrain 104 including an engine 106, such as an internal combustion engine, a motor-generator 202, and an energy storage system (ESS) 204 for generating power for the system 100. The engine 106 may be any type of internal combustion engine known in the art. In some applications, the internal combustion engine 106 may be a diesel engine, although gasoline engines and engines that operate with any type of fuel are contemplated herein. The engine 106 is in fluid communication with an engine intake system 105 through which charge air enters the engine 106, and an engine exhaust system 107 through which exhaust gas resulting from combustion in the engine 106 may exit the engine 106, it being understood that not all details of these systems that are typically present are shown. The exhaust gas passes through an exhaust aftertreatment system 109 fluidly coupled to the engine exhaust system 107. In certain embodiments, the exhaust aftertreatment system 109 promotes a chemical reaction between a reductant and a $NO_x$ constituent in the exhaust gas that reduces an amount of the $NO_x$ during nominal operation, at least partially converting $NO_x$ to $N_2$ to reduce the emissions of the engine 106.

ESS 204 can include, for example, a battery or other suitable device for storing energy from operation of vehicle system 100, such as regenerative braking energy or energy generated by operation of motor-generator 202. Motor-generator 202 can be operated with energy from ESS 204 alone or in conjunction with engine 106 to propel vehicle 102. The illustrated arrangement of the hybrid components 102, 202, 204 should not be considered limiting and any hybrid vehicle drivetrain arrangement is contemplated. In addition, aspects of the present disclosure can be employed in the operation of electric vehicles in which engine 106 is omitted.

The hybrid powertrain 104 further includes a transmission 108 operably connected to the engine 106 for adapting the output torque of the engine 106 and transmitting the output torque to a drive shaft 110. It is contemplated that in certain embodiments additional coupling components, such as an output shaft, a gear box, and one or more clutches (not shown) may be included in hybrid powertrain 104. Other suitable coupling arrangements capable of providing drive torque to the drivetrain are contemplated herein.

The vehicle 102 illustrated in FIG. 1 includes a rear wheel drive configuration including a final drive 112 having a rear differential 114 connecting the drive shaft 110 to rear axles 116a and 116b. It is contemplated that the components of the vehicle 102 may be positioned in different locations throughout the vehicle 102. In one non-limiting example, in a vehicle having a front wheel drive configuration, the transmission 108 may be a transaxle and the final drive 112 may reside at the front of the vehicle 102 to connect front axles to the engine 106 via the transaxle.

The vehicle 102 further includes two rear brakes 124a and 124b, each positioned between two rear wheels 126a and 126b and rear axles 116a and 116b, respectively. The vehicle 102 additionally includes two front brakes 120a and 120b, each positioned between and operably connected to two front wheels 122a and 122b and front axles 118a and 118b, respectively. It is contemplated that in certain embodiments the vehicle 102 may have more or fewer tires and/or brakes than illustrated in FIG. 1.

The vehicle 102 additionally includes an air handling system 180 and a fuel management system 190. In certain embodiments, the air handling system 180 may include the engine intake system 105, the engine exhaust system 107, an exhaust gas recirculation system (EGR), a turbocharger, and/or various actuators for controlling intake air and/or exhaust gas throughout the vehicle 102. In certain embodiments, the fuel management system 190 may include a fuel tank, fuel injectors, and the like for storing, monitoring, and distributing fuel throughout the vehicle 102.

The vehicle 102 includes an electronic or engine control unit (ECU) 130, sometimes referred to as an electronic or engine control module (ECM), or the like, which is directed to regulating and controlling the operation of engine 106. A transmission control unit (TCU) 140 is illustrated in the vehicle 102, which is directed to the regulation and control of transmission 108 operation. A hybrid control unit (HCU) 200 is directed to controlling operation of hybrid components, such as motor-generator 202 and ESS 204. The ECU 130, the TCU 140 and the HCU 200 are each in electrical communication with a plurality of vehicle sensors (not shown) in the vehicle 102 for receiving and transmitting conditions of the vehicle 102, such as temperature and pressure conditions, state of charge of a battery of ESS 204, vehicle and engine speeds, durations, and other operating conditions, for example. In certain embodiments, the ECU 130, the TCU 140 and/or the HCU 200 may be combined into a single control module, commonly referred to as a powertrain control module (PCM) or powertrain control unit (PCU), or the like. It is contemplated that the ECU 130 may be integrated within the engine 106 and/or the TCU 140 may be integrated within the transmission 108. Other various electronic control units for vehicle subsystems are typically present in the vehicle 102, such as a braking system electronic control unit and a cruise control electronic control unit, for example, but such other various electronic control units for vehicle subsystems are not show in system 100 to preserve clarity.

The vehicle 102 further includes a cycle efficiency management (CEM) controller 150 that employs control processes to control the speed of the vehicle 102 based on the route identification reference to optimize vehicle operations along the associated route. The CEM controller 150 may be electrically coupled to the ECU 130 and HCU 200 for receiving sensor data and conditions of the vehicle 102. The CEM controller 150, which may be dedicated to the control of just the operations described herein, is described in further detail in FIGS. 2-3, and/or directed toward an intermediary control for the regulation and control of the hybrid powertrain 104 in vehicle system 100.

In the illustrated embodiment, the CEM controller 150 is in electrical communication with the ECU 130, the TCU 140, and HCU 200. It is contemplated that in certain embodiments the CEM controller 150 may be in electrical communication with any of the ECU 130, the HCU 200 or the TCU 140. In certain embodiments, at least a portion of the CEM controller 150 may be integrated within the ECU 130, the TCU 140, and/or the HCU 200. The CEM controller 150 may further be in electrical communication with one or more of the plurality of vehicle sensors in the vehicle 102 for receiving and transmitting operating conditions of the vehicle 102.

It is contemplated that at least a portion of the conditions and/or measured inputs required for interpreting signals by the CEM controller 150 may be received from the ECU 130, the TCU 140 and/or the HCU 200, in addition to or alternatively to the plurality of vehicle sensors. It is further contemplated that in certain embodiments the ECU 130, the TCU 140, the HCU 200, and/or the CEM controller 150 may transmit data communication messages across a controller area network (CAN) bus. The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

In certain embodiments, any or all of the ECU 130, the TCU 140, the HCU 200, and the CEM controller 150 may be electronically communicatively coupled to a human-machine interface (HMI) 160, also commonly referred to as a man-machine interface (MMI), a human-computer interaction (HCI), an operator interface console (OIC) or terminal (OIT), or the like. The HMI 160 provides an interface for a human-machine interaction between an operator and one or more input, output, or combination peripheral interface devices (not shown). Example input peripheral interface devices include a sensor, a button, a microphone, a keyboard, a track pad, and a mouse. Examples of output peripheral interface devices include sensory devices such as a display monitor, an indicator light, a gauge, a printer, and a speaker. An example of a combination peripheral interface device includes a display monitor with touchscreen capability.

In certain embodiments, the HMI 160 may be structured to receive and interpret signals from each of the ECU 130, the TCU 140, the HCU 200, and the CEM module 150 and display them to the operator on the one or more output peripheral interface devices, generally via a graphical user interface (GUI), which provides graphical representations of the interpreted signals in a user readable form. In certain embodiments, the one or more input peripheral interface devices receive operator generated commands and transmit the commands to the HMI 160, where the HMI interprets the commands and relays signals to the ECU 130, the TCU 140, HCU 200 and/or the CEM controller 150. Other means of representing the interpreted signals to the operator in addition to or alternatively to the GUI are contemplated, including via one or more sensory indicators, such as indicator lights, tactile feedback, and/or audible sounds, for example.

In certain other embodiments, in addition to or as an alternative to the HMI 160, a machine-machine feedback interface may be included in the vehicle 102. For example, in a driverless (i.e., autonomous) vehicle application, a machine-machine feedback interface may be structured to receive and interpret signals from the ECU 130, the TCU, 140, HCU 200, and/or the CEM module 150 and provide feedback to and in a format readable by one or more control units operable to make decisions for the vehicle 102 based on the input signals that might otherwise be performed by the operator of the vehicle 102.

In the example embodiment illustrated in FIG. 1, a navigation and positioning system 170, such as a global position system (GPS) device, may be mounted external to the vehicle 102. Additionally or alternatively, an electronic horizon device may be connected to the vehicle 102. In certain embodiments, the navigation and positioning system 170 may be in electrical communication with the CEM controller 150 to provide route information to the CEM controller 150. In certain embodiments, additional information from the navigation and positioning system 170 may be transmitted to the CEM controller 150, such as traffic, elevation, and/or weather conditions, for example. It is contemplated that in certain embodiments, specifically where a navigation and positioning system 170 is not connected to the CEM controller 150, that route information may be programmed into memory and associated with a route identification reference and accessed by the CEM controller 150 at any portion along a route associated with the route identification reference.

The CEM controller 150 (or additionally or alternatively the HCU 200) includes stored data values, constants, and functions, as well as operating instructions stored on a non-transient computer readable medium. Any of the operations of example procedures described herein may be performed at least partially by the CEM controller 150. In certain embodiments, the CEM controller 150 includes one or more modules structured to functionally execute the operations of the CEM controller 150. The description herein including modules emphasizes the structural independence of the aspects of the CEM controller 150, and illustrates one grouping of operations and responsibilities of the CEM controller 150. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of the CEM controller 150 operations are included in the section referencing FIGS. 2-3. Operations illustrated are understood to be exemplary only, and operations may be combined or divided, and added or removed, as well as re-ordered in whole or in part.

Certain operations described herein include operations to interpret or determine one or more parameters. Interpreting and/or determining, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

The CEM controller 150 and/or HCU 200 is structured to control a drive cycle (e.g., a vehicle speed, a vehicle gear, an engine start/stop, propelling the vehicle with the engine, the motor-generator or both, a recharge stop, etc.) of hybrid powertrain 104 based on one or more route identification references associated with respective ones of one or more routes. The drive cycle can also be adjusted based on various vehicle conditions, cargo load and delivery conditions, costs associated with delivering the cargo load, and/or the like. In certain embodiments, the CEM controller 150 and/or HCU 200 may be further structured to alter the drive cycle based on real-time data received by the CEM controller 150 and/or HCU 200. The route characteristics may be based on a position of the vehicle as a function of time and an engine load, gear, cargo drop-off sequence, and/or vehicle speed as functions of time and/or distance. In certain embodiments, the CEM controller 150 and/or HCU 200 may be additionally structured to operate in an offline mode, providing a learned initial set of route characteristics to be associated with a route identification reference and/or to update previously learned route characteristics of a particular route.

The CEM controller 150 and/or HCU 200 can be structured to receive and interpret signals (i.e., inputs) from various sensors positioned throughout the vehicle 102 indicating conditions of at least a portion of the vehicle 102. The CEM controller can further be structured to receive and interpret signals from the ECU 130, the TCU 140, HCU 200, the HMI 160, and/or the navigation and positioning system 170.

Figure 2:
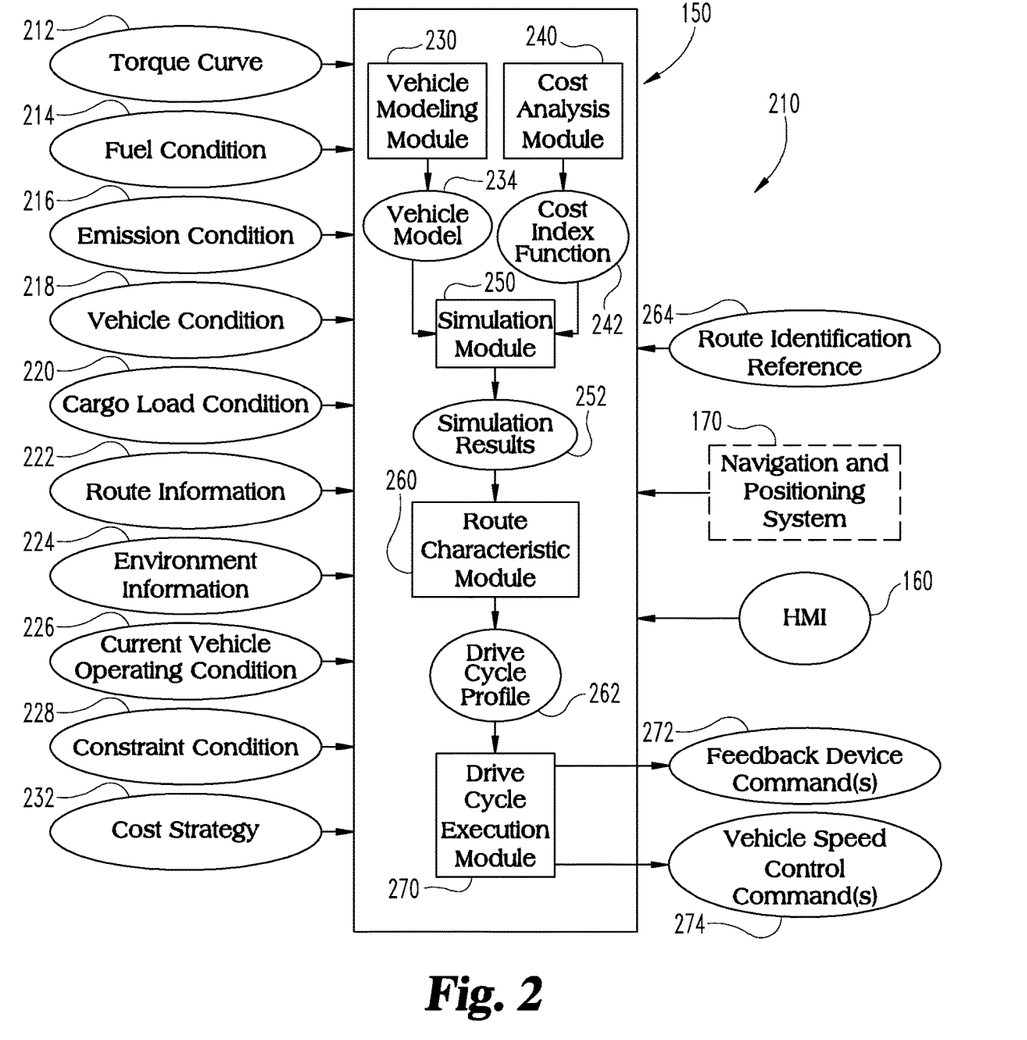
FIG. 2 is a block diagram of an example vehicle controller shown in FIG. 1.

With reference to FIG. 2, there is illustrated an embodiment 210 of the CEM controller 150 for determining a drive cycle in response to route characteristics for a route identified by a route identification reference and/or for controlling a drive cycle of hybrid powertrain 104 based on a particular route identification reference. The embodiment 200 includes a vehicle modeling module 230, a cost analysis module 240, a simulation module 250, a route characteristic determination module 260, and a route drive cycle execution module 270. Other arrangements that functionally execute the operations of the CEM controller 150 are contemplated in the present application. For example, CEM controller 150 and/or HCU controller 200 may include one or more drive cycle profiles 262 stored in a memory thereof that are predetermined or pre-learned based on one or more route characteristics for respective ones of one or more routes that each have a unique route identification reference 264 that is input into the CEM controller 150.

In certain embodiments, the inputs may include a torque curve input 212, a fuel condition input 214, an emission condition input 216, a vehicle condition input 218, a cargo load condition input 220, a route information input 222, an environment condition input 224, a current vehicle operating condition input 226, a constraint condition input 228, a cost strategy input 232, and a route identification reference 264.

It is contemplated that in certain embodiments, as an alternative to receiving the torque curve input 212, the CEM controller 150 may be further structured to determine a torque curve based on current, additional, and/or alternative inputs to the CEM controller 150 and/or various look-up tables stored within or accessible by the CEM controller 150. It is further contemplated that in certain embodiments, the cargo load condition input 220, the route information input 222, the constraint condition input 228, the cost strategy input 232 and/or the route identification reference 264 may be input by an operator (e.g., entered through the HMI 160) to a memory accessible and readable by the CEM controller 150 and/or passed as an interpretable signal to the CEM controller 150 upon request.

The fuel condition input 214 may include a fuel amount, a fuel cost, a fuel tank capacity, a number of fueling stops, and/or a distance between each of the fueling stops. The fuel cost may be the current fuel cost in a monetary unit cost per gallon or an average fuel cost along an available route. In certain embodiments, the fuel condition input 214 may further include the availability of a fuel source and/or a fuel source station, such as electric recharging stations, natural gas refueling stations, hydrogen refueling stations, and/or any other fuel source refilling known in the art.

The emission condition input 216 may include an emission output, an emission performance level, and/or a regeneration frequency of one or more components of the exhaust aftertreatment system of the vehicle 102. In certain embodiments, the emission condition input 216 may include a regeneration cost implication, such as the cost of operating the vehicle 102 under extended low engine load periods. The vehicle condition input 218 may include a rolling resistance, an air resistance, a powertrain gearing, a powertrain friction, a powertrain wear value, a maximum torque output, a temperature reading, a pressure amount, an air-to-fuel ratio, and/or an actuator position.

The cargo load condition input 220 may include a load weight, a load pickup time, a load pickup location, a load drop-off time, a load drop-off location, a temperature setting, a hazardous material cost, an insurance cost, and/or a permitting cost for a plurality of loads. In certain embodiments, the cargo load condition input 220 may include loads transitioned between vehicles, which may include different types of vehicles, and may additionally include portions of the route where the vehicle 102 is empty. The route characteristic information input 222 may include a route surface grade, a route surface type, a maximum speed limit, a minimum speed limit, a maximum route trip time, a traffic condition, and/or an elevation.

In certain embodiments, the route characteristic information input 222 may be received by the CEM controller 150 from the navigation and positioning system 170, such as a global positioning system (GPS) device and/or a manual route information entry device, for example. In certain embodiments, the manual route information entry device may include the HMI 160. The environment condition input 224 may include a wind amount, a precipitation amount, a precipitation type, and/or a relative humidity.

The current vehicle operating condition input 226 may include a current wheel speed, a current fuel amount, a current actuator position, a current torque output, a current air-to-fuel ratio, a current engine condition, and/or a current longitudinal velocity of the vehicle 102. The route characteristic constraint condition input 228 may include a start time, an end time, a maximum travel duration, a maximum number of fuel stops, a minimum fuel amount, a minimum number of rest periods, a maximum number of rest periods, a minimum rest duration and/or a maximum rest duration for each of the rest periods, a distance for each loop of the route, a number of loops in the route, a battery boost charging stop per loop, a number of scheduled stops per loop, and/or a nominal energy requirement for the vehicle system to complete a loop.

The cost strategy input 232 may be a cost control strategy input by the operator that may be based on the fuel cost, a total trip cost, an emission output cost, a vehicle wear cost, a consumer cost, a ton-mile cost, a vehicle maintenance cost, and/or a cargo cost. The cost strategy input 232 may include a cost strategy to minimize any of the costs associated with the cost control strategy (i.e., a cost minimization strategy). In certain embodiments, the cost minimization strategy may include a fuel economy strategy, a total cost of ownership minimization strategy, and/or a system wear minimization strategy. In certain embodiments, the cost strategy input 232 may additionally or alternatively include an income maximization strategy, such as during an incentive based delivery route, for example. It is contemplated that in certain embodiments a combination of cost control strategies may be included in the cost strategy input 232.

The vehicle modeling module 230 may be structured to receive and interpret any of the CEM controller 150 inputs to determine a vehicle model 234. In certain embodiments, the vehicle model 234 may be based on components internal to the vehicle 102, such as the hybrid powertrain 104, and/or elements external to the vehicle, such as the environment condition input 224. The cost analysis module 240 may be structured to receive and interpret the cost strategy input 232 to determine a cost index function.

The simulation module 250 may be structured to receive and interpret the vehicle model 234 from the vehicle modeling module 230 and the cost index function 242 from the cost analysis module 240. The simulation module 250 may be further structured to perform one or more simulations for a route from the route information input 222 based on the vehicle model 234 and/or the cost index function 242. In certain embodiments, the results of the one or more simulations may include a cost index function for each of the simulations. It is contemplated that the vehicle model 234 may be updated at any point during the route. It is further contemplated that the vehicle model 234 updated during the route may be a limited form of the model, such as a vehicle model relative only to certain actuators or parameters and/or a vehicle model only responsive to significant disturbance or deviation from the current route. In certain other embodiments, the vehicle model 234 may be constrained to only update under certain conditions.

The route characteristic determination module 260 may be structured to receive and interpret the simulation results 252 to determine a recommended drive cycle profile 262 for a route identified by a route identification reference 264. In certain embodiments, the recommended drive cycle profile 262 is determined by the route characteristic determination module 260 based on the cost index function. In certain embodiments, route characteristic determination module 260 may be further structured the receive route information from the navigation and positioning system 170. It is contemplated that only a portion of the route characteristic information input 222 and/or constraint conditions 228 may be used to determine the recommended drive cycle profile 262 under certain conditions.

The drive cycle execution module 270 may be structured to receive and interpret the drive cycle profile 262 that is associated with the route identification reference 264. The drive cycle execution module 270 may be further structured to determine one or more commands to one or more output devices. In certain embodiments, the output devices may include a memory device, a sensory feedback device, and/or a vehicle speed control device. The commands may include a feedback device command 272 and/or a vehicle speed control command 274 based on the drive cycle profile 262.

The feedback device command 272 may be provided to an output notification device structured to receive and interpret the feedback device command 272 and to provide sensory feedback to the operator of the vehicle 102. The output notification device may include the human machine interface 160, an on-board diagnostic (OBD) connected device (e.g., a human readable interface connected via an OBD serial port), an indicator lamp, a gauge, a printer, a memory device, a speaker, and/or any display device capable of displaying the route reference corresponding to the feedback device command 272 to the operator. In certain embodiments, the output notification device may additionally or alternatively include a memory device for storing a log of the vehicle models 234, cost index functions 242, simulation results 252, and/or drive cycle profile 262 during a trip, for example. In other embodiments, the feedback device command 272 may include a suggestion to change and/or recalibrate the drive cycle profile 162 for a particular route reference 264 based on simulation results 252, for example.

The vehicle speed control commands 274 may be provided to a vehicle speed control device structured to receive and interpret the feedback device command 272 and to control the speed of the vehicle 102 to execute the drive cycle profile 262. In certain embodiments, the vehicle speed control commands 274 may include setting a cruise speed limit and/or performing an automated vehicle control, such as providing the vehicle speed control commands 274 to the HCU 200 and/or the TCU 140 or directly to the transmission 108 to shift at certain points, and/or setting engine torque and/or speed limits. In certain embodiments, the vehicle speed control commands 274 may include a command to set a brake actuator position, a throttle actuator position, a fuel injector, an engine torque, a transmission gear ratio, and/or a final drive selection.

In other embodiments, a memory of the CEM controller 150 and/or HCU 200 includes one or more route identification references 264, which is associated with a route and a drive cycle profile 262 that is executed automatically along the route to provide the desired operational outcome.

Figure 3:
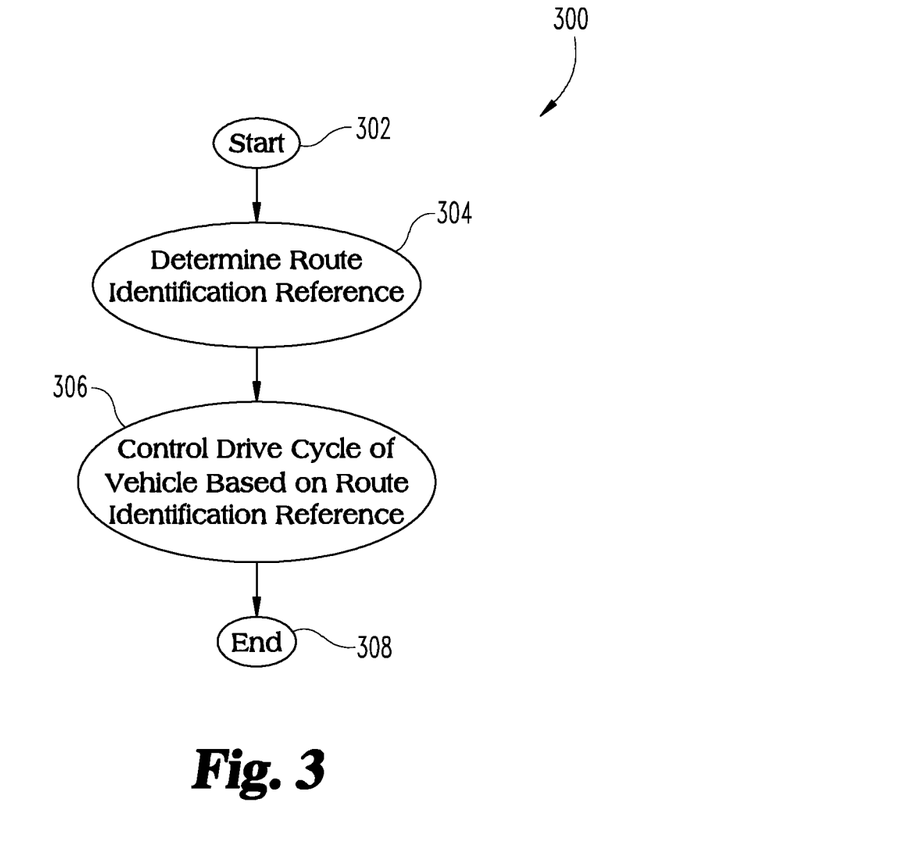
FIG. 3 is a flow diagram of an example procedure for determining controlling a hybrid vehicle in response to a route identification reference using the vehicle controller shown in FIG. 2.

The schematic flow diagram illustrated in FIG. 3 and related description which follows provides an illustrative embodiment of performing example procedures for providing one or more output device commands based on a recommended route reference. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of a procedure 300 for determining a recommended route reference and providing commands to one or more output devices. The procedure 300 may be put into operation by programming, for example, the CEM controller 150 and/or HCU 200 for use in, for example, vehicle 102. The procedure 300 begins at operation 302, in which a control routine for the CEM controller 150 is started. Operation 302 may begin by interpreting a key-on event, completion of a cycle, restarting procedure 300, and/or by initiation by the operator or a technician.

Procedure 300 continues to operation 304 to determine from at least one input device in a hybrid vehicle system, a route identification reference for a route of the hybrid vehicle system. The route identification reference can be input by the operator, entered remotely, determined automatically, or determined from another input, such as a location or time of day associated with operation of the vehicle. Procedure 300 continues at operation 306 to control a drive cycle of the hybrid vehicle system during the route based on the route identification reference (route ID). The drive cycle can be predetermined based on one or more route characteristics of the route associated with the route identification reference.

The route characteristics upon which the drive cycle is based may include one or more of a distance for each loop of the route, a number of loops in the route, a battery boost charging stop per loop, a number of scheduled stops per loop, a nominal energy requirement for the vehicle system to complete a loop, a change in elevation, a route surface grade, a route surface type, a maximum speed limit, a minimum speed limit, a maximum route trip time, and a traffic condition. The route characteristics can be stored in a memory of the controller, but need not be since only the associated drive cycle profile 262 needs to be accessed when the route identification reference 264 is determined. The drive cycle profile 262 can include, for example, adjusting nominal usage of an energy storage device, adjusting a nominal battery depletion strategy, and adjusting nominal engine on/off strategies of the hybrid vehicle in response to the route characteristics of the associated route identification reference 264. The drive cycle profile 262 can also be controlled to meet a performance target of at least one of a cost minimization strategy, a fuel efficiency maximization strategy, a system wear minimization strategy, and an income maximization strategy.

Figure 4:
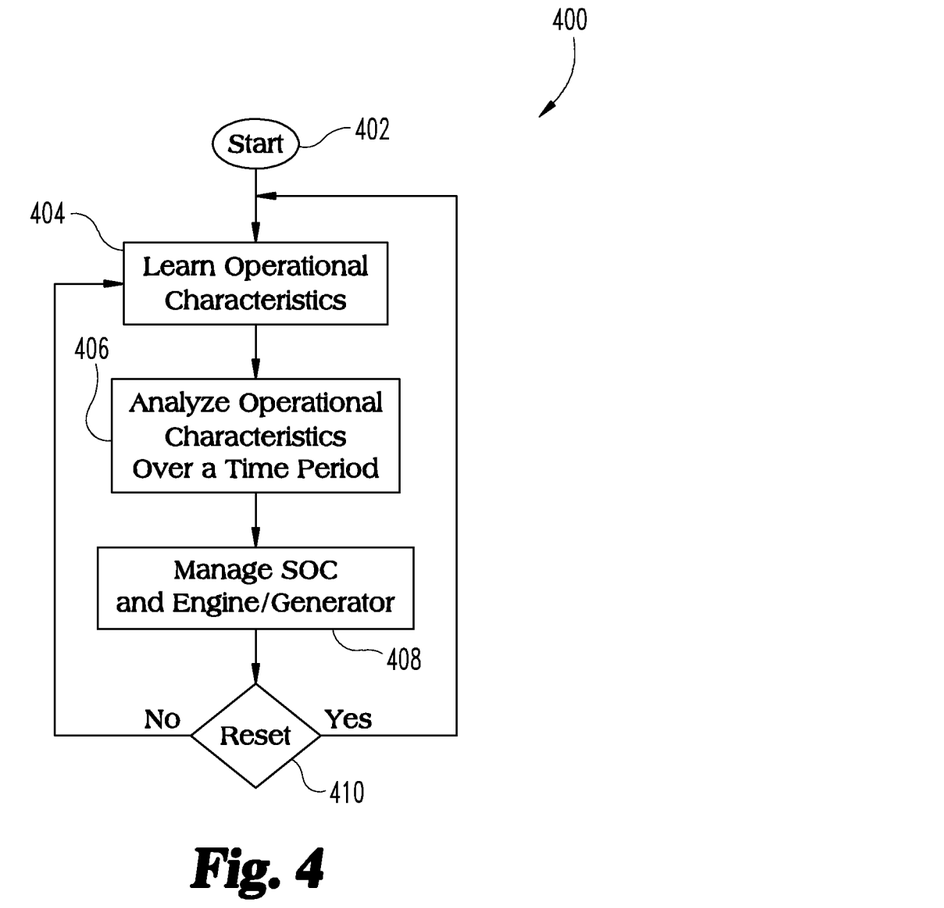
FIG. 4 is a flow diagram of an example procedure for determining learning historical characteristics to manage SOC using the vehicle controller shown in FIG. 2.

In certain embodiments, before controlling the drive cycle with, for example, the vehicle CEM controller 150 and/or HCU 200, the CEM controller 150 and/or HCU 200 learns, from at least one input device, the one or more route characteristics as the hybrid vehicle system traverses the route. The route characteristics upon which the drive cycle is based may include learned operational characteristics to manage the state-of-charge (SOC) of the energy storage system 204 for a route associated with a route ID. With reference to FIG. 4, a procedure 400 for learning route characteristics begins at operation 402, in which a control routine for the CEM controller 150 is started. The procedure 400 continues at operation 404 to learn operational characteristics of the vehicle while operating along the route. The one or more route characteristics can be learned from one or more operating inputs of the hybrid vehicle system along the route. The one or more operating inputs can include one or more of a route duration, a number of route stops, a route stop duration, battery state-of-charge changes over time along the route, aftertreatment temperatures along the route, idling time along the route, or any other input discussed herein.

Procedure 400 continues at operation 406 to analyze the learned operational characteristics collected or learned over a period of time. This historical information may be collected over a set time period and statistically analyzed to determine, for example, averages, medians, maximums, and minimums of the associated data. In one embodiment, the information may be used to manage a SOC of a battery in an energy storage system 204, or control starting and stopping of one or both of an engine and a motor/generator of a powertrain 104. There may also be a conditional reset 410 that either returns the procedure to start 402 if reset 410 is active, or the procedure returns to operation 404 to continue to learn operational characteristics if reset 410 is not active. This reset may, for example, occur automatically at the end of a time period, be a forced reset by an operator or other input to the control system, or occur in any suitable manner. In certain embodiment, the CEM controller 150 and/or HCU controller 200 re-sets or updates previously learned route characteristics after learning the route characteristics and adjusts the drive cycle profile 262 in response thereto.

In other embodiment, the method includes determining one or more cargo load references and adjusting or controlling the drive cycle 262 in response to the one or more cargo load references. The cargo load references include at least one of a load weight, a load pickup time, a load pickup location, a load drop-off time, and a load drop-off location.

In certain embodiment, the method includes providing a control command from the vehicle controller to a vehicle speed control device of the vehicle 102 to operate the vehicle according to the predetermined or stored drive cycle 262 of the associated route identification reference 264. In certain embodiments, the vehicle speed control device may include a brake actuator, a throttle actuator, a fuel injector, the engine 106, the motor-generator 202, the transmission 108, the final drive 112, and/or other vehicle control device capable of adjusting the speed of the vehicle. In certain embodiments the control command may include a position of the brake actuator, a position of the throttle actuator, a fuel rate of the fuel injector, a torque output of the engine 106, a torque output of the motor-generator 202, a gear ratio of the transmission 108, and/or a selection of the final drive 112.

Various aspects of the present disclosure are contemplated. According to one aspect, a method includes receiving, from at least one input device in a vehicle system, a route identification reference associated with a route of the vehicle system; and controlling, with a vehicle controller, a drive cycle of the vehicle system during the route based on the route identification reference.

In another aspect, an apparatus for a vehicle control system is provided. The vehicle control system is configured to receive a route identification reference associated with a route of a vehicle associated with the vehicle control system. The vehicle control system includes a vehicle controller that is configured to control a drive cycle of the vehicle during the route based on the route identification reference.

According to another aspect, a system includes a vehicle controller operatively coupled to a motor/generator and an energy storage system of a vehicle system. The vehicle controller is configured to selectably provide power from at least one of the motor/generator and the energy storage system to drive one or more ground contacting wheels along a route of the vehicle system. The vehicle controller includes a memory with at least one route identification reference associated with the route of the vehicle system. The vehicle controller is configured to control a drive cycle of the vehicle system along the route based on the route identification reference stored in the vehicle controller In one embodiment, the drive cycle is predetermined and based on at least one route characteristic of the route including: a distance for each loop of the route; a number of loops in the route; a battery boost charging stop per loop; a number of scheduled stops per loop; a nominal energy requirement for the vehicle system to complete a loop; a change in elevation; a route surface grade, a route surface type, a maximum speed limit, a minimum speed limit, a maximum route trip time, and a traffic condition.

In another embodiment, the drive cycle is controlled for at least one of: adjusting nominal usage of an energy storage device; adjusting a nominal battery depletion strategy; and adjusting nominal engine on/off strategies of the vehicle system.

In yet another embodiment, the drive cycle is stored in a memory of the vehicle controller. In a refinement of this embodiment, the memory includes drive cycles stored therein for a plurality of route identification references each associated with a different route.

In still another embodiment, before controlling the drive cycle with the vehicle controller, the one or more route characteristics are learned as the vehicle system traverses the route. In a refinement of this embodiment, the one or more route characteristics are learned from one or more operational characteristics of the vehicle system along the route. The one or more operational characteristics include one or more of: a route duration; a number of route stops; a route stop duration, battery state-of-charge changes over time along the route; aftertreatment temperatures along the route; and idling time along the route. In a further refinement, the route characteristics are re-set after learning the route characteristics. In another refinement, the route characteristics are updated from one or more operational characteristics after learning the route characteristics.

In another embodiment, the drive cycle is controlled to meet a performance target of at least one of a cost minimization strategy, a fuel efficiency maximization strategy, a system wear minimization strategy, and an income maximization strategy.

In yet another embodiment, the vehicle controller interprets or determined one or more cargo load references and adjusts the drive cycle in response to the one or more cargo load references. In a refinement of this embodiment, the cargo load references include at least one of a load weight, a load pickup time, a load pickup location, a load drop-off time, and a load drop-off location.

In another embodiment, vehicle system is a hybrid vehicle system and the vehicle controller includes at least one of a hybrid controller and a cycle efficiency management controller.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   receiving, from at least one input device in a vehicle system of a vehicle, a route identification reference associated with a route of the vehicle system, wherein the route is repeated by the vehicle system due to traversing the route by the vehicle;
   determining from the at least one input device, one or more route characteristics as the vehicle traverses the route by comparing the one or more route characteristics of the route with corresponding preceding route characteristics;
   in response to the determining, controlling, with a vehicle controller, a drive cycle that is stored in a memory of the vehicle controller of the vehicle system during the route based on route identification reference and the one or more route characteristics determined from the at least one input device.

2. The method of claim 1, wherein the drive cycle is predetermined and based on one or more route characteristics of the route including: a distance for each loop of the route; a number of loops in the route; a battery boost charging stop per loop; a number of scheduled stops per loop; a nominal energy requirement for the vehicle system to complete a loop; a change in elevation; a route surface grade; a route surface type, a maximum speed limit, a minimum speed limit, a maximum route trip time, and a traffic condition.

3. The method of claim 1, wherein controlling the drive cycle includes at least one of: adjusting nominal usage of an energy storage device; adjusting a nominal battery depletion strategy; and adjusting nominal engine on/off strategies of the vehicle system.

4. The method of claim 1, wherein the memory includes the drive cycles stored therein for a plurality of route identification references each associated with a different route.

5. The method of claim 1, wherein the one or more route characteristics are determined from one or more operational characteristics of the vehicle system along the route, the one or more operational characteristics including one or more of: a route duration; a number of route stops; a route stop duration; battery state-of-charge changes over time along the route; aftertreatment temperatures along the route; and idling time along the route.

6. The method of claim 5, further comprising re-setting the one or more route characteristics after determining the one or more route characteristics.

7. The method of claim 5, further comprising updating the one or more route characteristics from one or more operational characteristics after determining the one or more route characteristics.

8. The method of claim 1, wherein controlling the drive cycle includes meeting a performance target of at least one of a cost minimization strategy, a fuel efficiency maximization strategy, a system wear minimization strategy, and an income maximization strategy.

9. The method of claim 1, further comprising interpreting, with the vehicle controller, one or more cargo load references and adjusting the drive cycle in response to the one or more cargo load references.

10. The method of claim 9, wherein the one or more cargo load references include at least one of a load weight, a load pickup time, a load pickup location, a load drop-off time, and a load drop-off location.

11. The method of claim 1, wherein the vehicle system is a hybrid vehicle system and the vehicle controller includes at least one of a hybrid controller and a cycle efficiency management controller.

12. An apparatus, comprising:
   a vehicle control system, wherein the vehicle control system is configured to receive from at least one input device in a vehicle system a route identification reference associated with a route of a vehicle, wherein the route is repeated by the vehicle system due to traversing the route by the vehicle, wherein the at least one input device determines one or more route characteristics as the vehicle traverses the route by comparing the one or more route characteristics of the route with corresponding previous route characteristics; and
   a vehicle controller, wherein the vehicle controller is configured, in response to the determining, to control a drive cycle that is stored in a memory of the vehicle controller of the vehicle during the route based on the route identification reference and the one or more route characteristics determined from the at least one input device.

13. The apparatus of claim 12, wherein the drive cycle is predetermined and based on one or more route characteristics of the route including: a distance for each loop of the route; a number of loops in the route; a battery boost charging stop per loop; a number of scheduled stops per loop; a nominal energy requirement for the vehicle system to complete a loop; a change in elevation; a route surface grade; a route surface type; a maximum speed limit; a minimum speed limit; a maximum route trip time; and a traffic condition.

14. The apparatus of claim 13, wherein the vehicle controller is operationally connected to the at least one input device to receive data regarding the at least one route characteristic as the vehicle system traverses the route, wherein the at least one route characteristic is determined from one or more operational characteristics of the vehicle system along the route, the one or more operational characteristics including one or more of: a route duration; a number of route stops; a route stop duration; battery state-of-charge changes over time along the route; aftertreatment temperatures along the route; and idling time along the route.

15. The apparatus of claim 12, wherein the memory includes drive cycles stored therein for a plurality of route identification references each of which is associated with a different route.

16. A system comprising:
a vehicle controller operatively coupled to a motor/generator and an energy storage system of a vehicle system, the vehicle controller configured to selectably provide power from at least one of the motor/generator and the energy storage system to drive one or more ground contacting wheels along a route of the vehicle system, wherein the route is repeated by the vehicle system due to traversing the route by the vehicle, wherein at least one input device determines at least one route characteristic as the vehicle traverses the route by comparing the at least one characteristic of the route with either a corresponding baseline or previous route characteristic; and
wherein the vehicle controller includes a memory with at least one route identification reference associated with the route of the vehicle system, the vehicle controller being configured, in response to the determining, to control a drive cycle of the vehicle system along the route based on the route identification reference stored in the vehicle controller and the at least one route characteristic determined from the at least one input device.

17. The system of claim 16, wherein the drive cycle is predetermined and based on the at least one route characteristic of the route including: a distance for each loop of the route; a number of loops in the route; a battery boost charging stop per loop; a number of scheduled stops per loop; a nominal energy requirement for the vehicle system to complete a loop; a change in elevation; a route surface grade; a route surface type; a maximum speed limit; a minimum speed limit; a maximum route trip time; and a traffic condition.

18. The system of claim 17, wherein the vehicle controller is operationally connected to the at least one input device to receive data regarding the at least one route characteristic as the vehicle system traverses the route, wherein the at least one route characteristic is determined from one or more operational characteristics of the vehicle system along the route, the one or more operational characteristics including one or more of: a route duration; a number of route stops; a route stop duration; battery state-of-charge changes over time along the route; aftertreatment temperatures along the route; and idling time along the route.

* * * * *